April 4, 1950 W. W. HANSEN ET AL 2,502,456

ULTRA HIGH FREQUENCY DISCRIMINATOR AND APPARATUS

Filed April 2, 1943 2 Sheets-Sheet 1

INVENTORS:
W. W. HANSEN
V. R. LEARNED
BY Paul B. Hunter
ATTORNEY

ULTRA HIGH FREQUENCY DISCRIMINATOR AND APPARATUS

Filed April 2, 1943 2 Sheets-Sheet 2

INVENTORS:
W. W. HANSEN
V. R. LEARNED
BY Paul B. Hunter
ATTORNEY

Patented Apr. 4, 1950

2,502,456

UNITED STATES PATENT OFFICE 2,502,456

ULTRA HIGH FREQUENCY DISCRIMINATOR AND APPARATUS

William W. Hansen, Garden City, and Vincent R. Learned, Hempstead, N. Y., assignors to The Sperry Corporation, a corporation of Delaware Application April 2, 1943, Serial No. 481,634

21 Claims. (Cl. 250—20)

The present invention relates, generally, to ultra high frequency discriminator devices and to apparatus employing the same, such as frequency stabilization systems or frequency modulation receiver.

Heretofore, difficulties have been encountered in detecting ultra-high-frequency frequency-modulated carriers due to the fact that the ordinary tuned transformer-rectifier arrangement used in discriminators is incapable of efficiently handling ultra high frequencies due to the large losses involved. Radiation at ultra high frequencies from tuned transformer circuits is enormous so that the resulting losses greatly reduce the over-all efficiency of the discriminator.

One object of the present invention is to provide a novel ultra high frequency discriminator employing a cavity resonator adapted to operate simultaneously in two modes of oscillation separated by a suitable frequency difference, together with associated detector means for effecting detection of ultra-high-frequency frequency-modulated carriers.

Another object of the invention is to provide a novel ultra high frequency discriminator of simple construction which is reliable in operation and is highly efficient.

Still another object of the invention is to provide a novel ultra high frequency discriminator adapted for other uses, such as the stabilization of the frequency of an ultra high frequency oscillator.

Another object of the present invention is to provide a novel ultra high frequency discriminator employing a cavity resonator adapted to operate in a single mode of oscillation together with a connected bridge circuit, an attenuator being used for initially balancing the bridge circuit.

Other objects and advantages will become apparent from the specification, taken in connection with the accompanying drawings wherein the invention is embodied in concrete form.

Similar characters of reference are used in all of the above figures to indicate corresponding parts.

Figures 1, 5, 6, 7, 8:
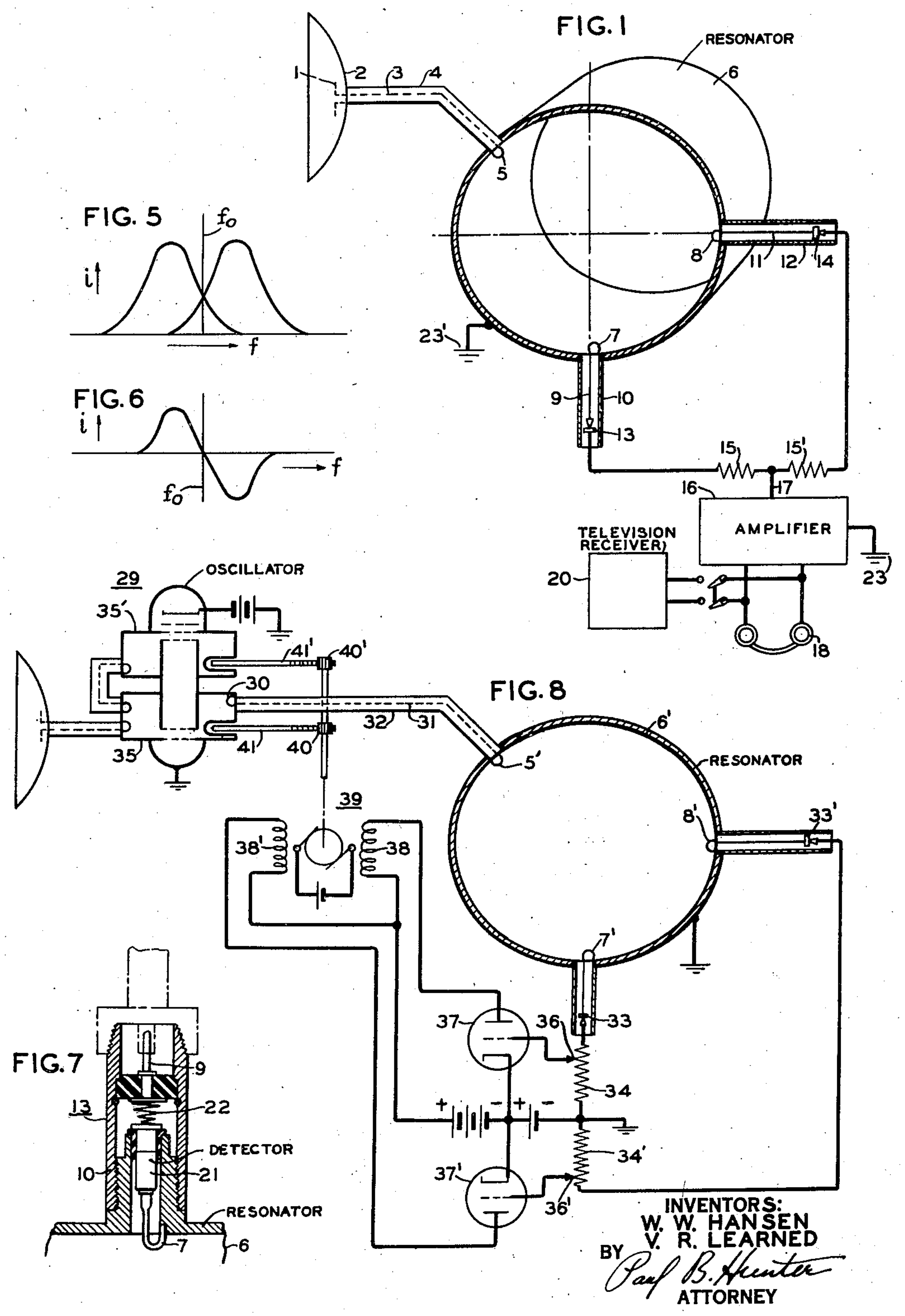
Fig. 1 is a schematic wiring diagram of a novel discriminator of the present invention.
Fig. 5 is a graph showing the current plotted against frequency for each of the two modes of oscillation of the resonator used in the structure of Fig. 1.
Fig. 6 is a graph illustrating the difference in detector outputs of the resonator of Fig. 1, i. e., one of the curves of Fig. 5 inverted.
Fig. 7 is a sectional view of a detector adapted for use in the device of the present invention.
Fig. 8 is a diagrammatic view illustrating a novel discriminator of this invention employed for effecting mechanical tuning of an ultra high frequency oscillator.

Referring particularly to Figs. 1 to 6 of the drawings, the reference numeral 1 designates suitable means for receiving a frequency-modulated high frequency carrier, means 1 being shown, for example, as a receiving antenna within a directional receiver-reflector 2 and connected through a concentric line 3, 4 and loop 5 for energizing a hollow or cavity resonator 6 which is of slightly elliptical cross-section. Owing to the elliptical cross-sectional shape of the resonator 6, the same will oscillate simultaneously in two modes, these modes being illustrated in Figs. 2 and 3 of the drawings wherein it is noted that the general direction of the electric vectors of the standing electromagnetic fields of the two modes of oscillation extend at right angles to each other. In these figures the arrows represent the direction of the electric component of the standing fields, whereas the dots represent the points of greatest intensity of magnetic field.

The loop 5 is preferably positioned angularly midway between the minor and major axes of the elliptical cross-section of the resonator 6. The two modes of oscillation taking place in this resonator are preferably separated as to frequency by a relatively small amount. For example, if the operating wavelength of the received carrier is of the order of 10 centimeters, the resonant frequencies of the two modes may be of the order of 300 kilocycles apart. Energy is shown taken from each mode of oscillation by use of loops 7 and 8, preferably positioned on the minor and major axes on the elliptical cross-section of the resonator. Loops 7 and 8 are shown connected to concentric lines 9, 10 and 11, 12. The current vs. frequency response of the two modes of oscillation as picked up by loops 7 and 8 is shown in Fig. 5 wherein the peaks of the resonance curves shown are spaced by the frequency difference of the two modes of oscillation. Normally, the unmodulated carrier frequency would preferably be halfway between these two resonance peaks.

In order that the outputs of the two loops 7 and 8 may be usable, it is necessary to invert one of these curves, and this is accomplished by passing the outputs of these loops through crystal detectors 13 and 14 which rectify in opposite directions. In Fig. 1 of the drawings, the crystal detectors 13 and 14 are shown as having the same rectifying characteristics but are oppositely connected, thereby obtaining the desired result, namely, rectification in opposite directions.

The outputs of crystal detectors 13 and 14 are connected in opposition through resistors 15 and 15', respectively. When the drops across these resistors are equal, i. e., when there is no frequency modulation of the carrier (when the resonator excitation frequency is $f_0$), there is no voltage supplied to the amplifier 16 from lead 17 connected to a common point of resistors 15, 15'. When the carrier signal is frequency-modulated, the output of one detector becomes smaller and the other becomes larger, in accordance with the modulation signal of the frequency-modulated wave, resulting in a net output which is supplied through lead 17 to the amplifier 16, the output of which may be used to supply a suitable audio indicator such as the earphones 18 or television receiver 20. If desired, a transformer may be used in lieu of resistors 15 and 15'.

Fig. 7 illustrates a typical crystal detector such as used in Fig. 1 at 13 and 14. The crystal element itself and its "cat's whisker" are contained within a body 21. The outer end of the body 21 is capacity coupled to the outer conductor 10 of the concentric line 9, 10, thereby providing a passage for high frequency current, the rectified current flowing through a spring contact 22 and conductor 9 to resistor 15 and from thence to the amplifier 16. The grounds shown at 23 and 23' provide the return for the rectified current to loop 7 and thereby to the other terminal of detector 21.

Figures 2, 3, 4, 9, 10, 11:
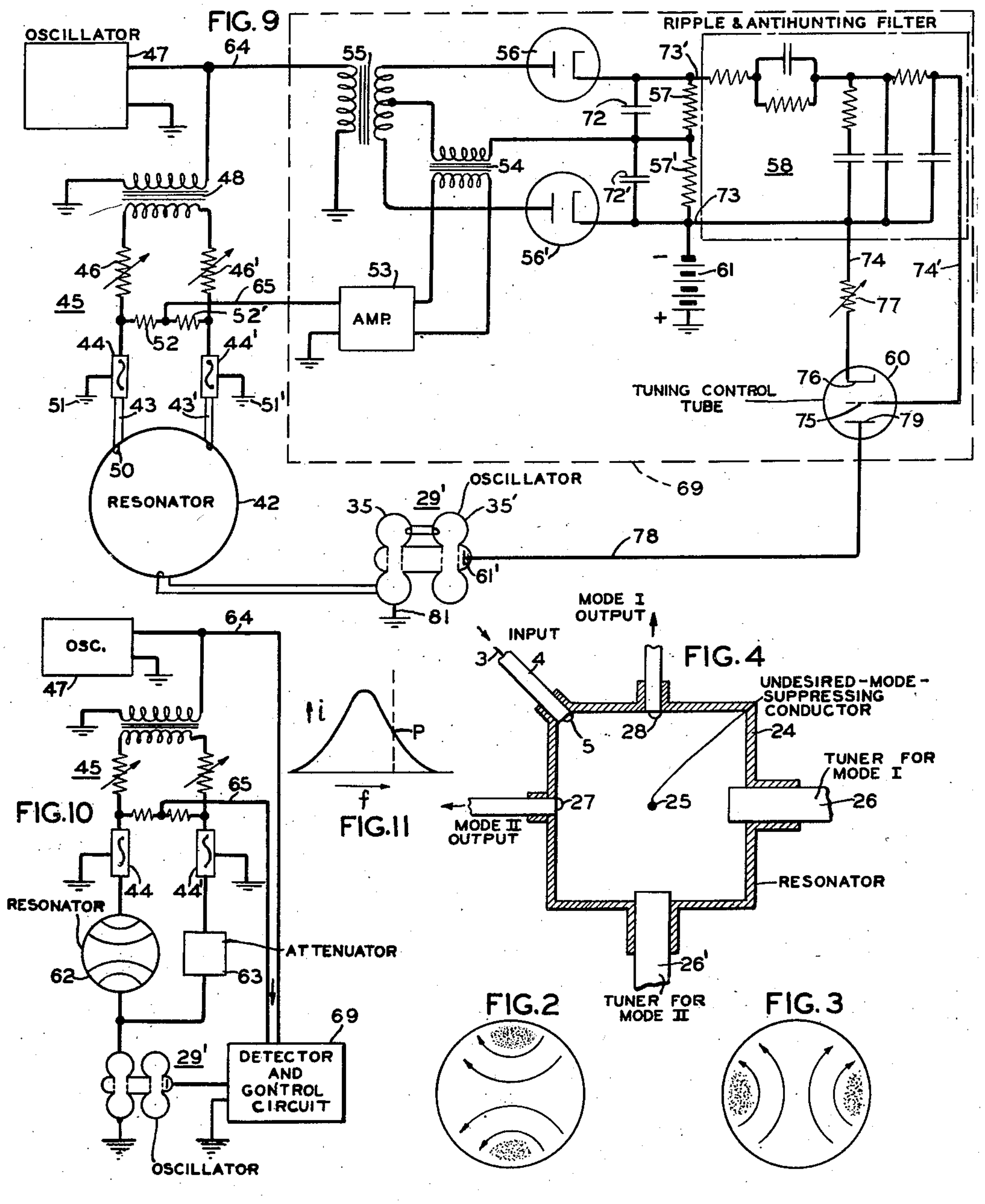
Figs. 2 and 3 are schematic views illustrating modes of oscillations within the resonator of Fig. 1.
Fig. 4 is a sectional view of a different form of the resonator.
Fig. 9 is a schematic view illustrating a discriminator employing a grid controlled circuit connected for thermionic tuning of an ultra high frequency oscillator.
Fig. 10 illustrates a modification of a portion of the structure of Fig. 9.
Fig. 11 is a graph showing the current-frequency characteristic of the cavity resonator employed in the structure of Fig. 10.

While an elliptical resonator may be used as shown in Fig. 1, other types of resonators may be employed, such as the cubical resonator shown in Fig. 4, the ultra high frequency energy being supplied to this resonator through line 3, 4, as explained in connection with Fig. 1. Preferably, the operating frequency is chosen midway between the resonant frequency of the two modes of the resonator 24. With the supplied energy of the proper frequency, resonance in the transverse electric mode occurs. A conductor bar 25 extending at right angles to the electric vectors of both modes may be used, if desired, within resonator 24. This bar serves to short circuit modes whose electric vector extends parallel to the bar 25. A similar bar may be used in the resonator of Fig. 1, if desired. Each of the two modes of oscillation within the resonator 24 may be tuned separately, as by moving plungers 26 and 26' inwardly or outwardly of the resonator. Or, if desired, two adjoining walls of the resonator may have flexible portions permitting slight inward and outward distortion thereof to effect desired tuning, as shown in the patent to Webster et al. No. 2,227,372. Energy is shown taken from each mode of oscillation by the use of pick-up loops 27 and 28 and connected concentric lines. Probes could be used in lieu of loops 27 and 28, if desired. The operation of the discriminator using the resonator of Fig. 4 is similar to that of Fig. 1.

In addition to its use as a discriminator for detecting ultra-high-frequency frequency-modulated carriers, this apparatus is valuable for other uses. In Fig. 8 the apparatus is shown employed for stabilizing the frequency of an ultra high frequency oscillator 29 shown as of the grouped electron beam type such as is disclosed in Varian Patent No. 2,242,275.

A slightly elliptical resonator 6' similar to resonator 6 of Fig. 1 is coupled to the output resonator 35 of oscillator 29 by means of the coupling loop 30 in resonator 35, concentric transmission line 31, 32, and coupling loop 5' in resonator 6'. Coupling loop 5' is located in resonator 6' in a position such that two modes of oscillation are set up in this resonator similar to those shown in Figs. 2 and 3. A pick-off loop 7' has one end grounded to the wall of resonator 6' and the other end connected through a rectifier 33 and resistor 34 to ground. Pick-off loop 7' is positioned so that it is responsive only to one of the two modes of oscillation of resonator 6'. Accordingly, the voltage appearing across resistor 34 will be proportional to the amplitude of oscillation of that one mode. A similar pick-off loop 8', positioned to be responsive only to the other mode of oscillation of resonator 6', has one end connected to the resonator wall and the other end connected through a similar rectifier 33' and resistor 34' to ground. Resistors 34 and 34' are provided with sliding taps 36 and 36', respectively, which are respectively connected to the grids of a pair of control tubes 37 and 37'. The anode circuits of these tubes 37 and 37' respectively include the opposed field windings 38 and 38' of the reversible tuning motor 39. The output shaft of motor 39 operates through gearing 40 and 40' to actuate tuning plungers 41 and 41' extending into the resonators 35' and 35 of oscillator 29. Any change in the position of the tuning plungers 41 and 41' will correspondingly vary the resonant frequency of the resonators of oscillator 29 and will thereby adjust the output frequency of oscillator 29.

In operation, resonator 6' is excited from oscillator 29 to oscillate in two modes. Pick-up loops 7' and 8' are responsive solely to respective modes of oscillation and feed the rectifiers 33 and 33' with voltages corresponding to the amplitudes of the respective modes of oscillation of resonator 6'. Accordingly, the respective voltages appearing across the resistors 34 and 34' will represent the amplitudes of the respective modes of oscillation. Sliding taps 36 and 36' may be adjusted so that for a predetermined desired frequency of oscillator 29, between the two resonant frequencies of the two modes of oscillation of resonator 6', equal currents will flow through windings 38 and 38' of motor 39, thus producing zero resultant field and holding motor 39 stationary. If the frequency of oscillator 29 varies from the desired value, the amplitude of one mode of oscillation will increase while that of the other mode of oscillation will decrease, as shown in Fig. 5. Accordingly, one of windings 38 or 38' will be supplied with greater current than the other, causing motor 39 to rotate in a corresponding sense to retune oscillator 29 to restore its frequency toward the predetermined value for which the field windings 38, 38′ of motor 39 are balanced. For opposite frequency deviation, motor 39 will rotate in the opposite direction. Thus, any deviation of the oscillator 29 from its desired operating frequency results in a differential voltage between taps 36 and 36′ causing operation of the tuning motor 39 and a readjusment of the frequency of the oscillator 29 back to the desired value. In this way the oscillator may be maintained at fixed frequency and substantially maximum output continuously.

Figure 12:
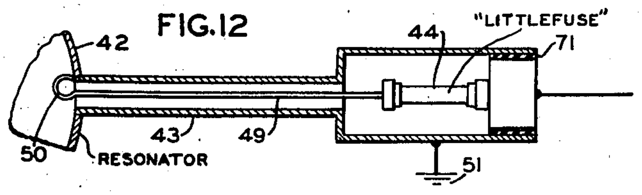
Fig. 12 is a fragmentary sectional view showing the connections for a "Littlefuse" in the circuit of Fig. 9 or 10.

In Fig. 9 of the drawings a high frequency oscillator 29′, which may be similar to oscillator 29, is arranged to be electronically tuned through use of the discriminator of the present invention. The slightly elliptical resonator 42 is coupled to the output of oscillator 29′ in the same manner as in Figs. 1 and 8 so as to set up two modes of oscillation therein similar to those shown in Figs. 2 and 3. Coupled to resonator 42 in a manner to be excited only by one of the two modes of oscillation therein is a concentric line 43 coupled to a current-variable resistor, such as a "Littlefuse" 44. Fig. 12 shows this connection more in detail. Thus, coupling loop 50 is coupled to the field within resonator 42 to be responsive only to the one mode of oscillation. Coupling loop 50 has one terminal connected to the grounded wall of resonator 42 and the other terminal connected to the inner conductor 49 of transmission line 43. The variable resistor 44 is connected in series with this inner conductor 49 and has its remote end capacitively by-passed to ground at 51 by the capacitance 71. A similar resistor or "Littlefuse" 44′ is similarly coupled to resonator 42 by transmission line 43′ to be excited only in response to the other mode of oscillation.

The ends of resistors 44 and 44′ remote from resonator 42 are connected together through series-connected resistors 52 and 52′. An oscillator 47 adapted to supply ordinary radio frequency or high audio frequency energy is connected through a transformer 48 and adjustable resistors 46, 46′ across the series-connected resistors 52 and 52′.

Resistors 44, 44′, 52 and 52′ form a bridge circuit, across one diagonal of which is impressed an alternating voltage from oscillator 47. The bridge output voltage is derived from between the junction of resistors 52, 52′ and ground, these terminals forming the other bridge diagonal. The various resistors are so chosen that for equal amplitudes of the two modes of oscillation of resonator 42, the bridge is balanced, producing zero output.

If oscillator 29′ varies in frequency, this will result in an increase of amplitude of oscillation in one mode and a decrease in the amplitude of oscillation in the other mode. Such variations in the amplitudes of oscillation produce corresponding variations in the ultra high frequency energy supplied to the current-variable resistors 44, 44′. These resistors therefore will vary oppositely in resistance, producing an unbalance in the bridge 45 and accordingly producing a corresponding alternating output voltage of the same frequency as the output of oscillator 47.

For a variation in the frequency of oscillator 29′ in opposite sense, the bridge unbalance will have correspondingly opposite sense, and the output voltage will then have opposite phase-sense while remaining of the same frequency. Accordingly, the voltage output of bridge 45 is a reversible phase, variable magnitude, alternating voltage having a phase-sense and amplitude corresponding to the sense and magnitude of deviation of the output frequency of oscillator 29′ from its desired value.

The bridge output is connected to the input to a suitable amplifier 53. The output of amplifier 53 is connected to a transformer 54 whose secondary winding is connected across a rectifier 56 in series with a load resistance 57 and one-half of the secondary winding of a transformer 55. The secondary of transformer 54 is also connected across a rectifier 56′ in series with a load resistor 57′ and the other half of the secondary winding of transformer 55. Suitable by-pass condensers 72 and 72′ are connected in shunt respectively across load resistors 57 and 57′. The primary winding of transformer 55 is connected to the output of oscillator 47, which thereby supplies a reference voltage.

Rectifiers 56 and 56′ form a phase-sensitive detector or balanced demodulator which converts the reversible-phase, variable-magnitude, alternating control voltage into a reversible-polarity, variable-magnitude, unidirectional voltage. In the absence of any voltage appearing across the secondary of transformer 54, rectifiers 56 and 56′ are supplied with equal and oppositely phased alternating voltages from the respective halves of the secondary of transformer 55, so that equal unidirectional voltages appear across resistors 57 and 57′. These voltages are of opposite polarity so that zero resultant output is produced across the series connection of resistors 57 and 57′, and no output voltage appears between output leads 73 and 73′.

When a condition of unbalance of bridge 45 occurs so that a voltage appears across the output of transformer 54, this alternating control voltage will aid the reference voltage of one-half of the secondary of transformer 55 and will oppose that of the other half. This produces a corresponding unbalance of the voltages across resistors 57 and 57′ and produces a resultant output unidirectional voltage V across resistors 57 and 57′ of one polarity and having a magnitude corresponding to the magnitude of the control voltage. When the control voltage reverses its phase, the condition of unbalance of the voltages across the resistors 57 and 57′ is also reversed, and the resultant output voltage V between leads 73, 73′ is of opposite polarity. In this way the reversible-phase control voltage is transformed into a reversible polarity, unidirectional control voltage.

This output reversible-polarity unidirectional voltage is utilized to control the output frequency of oscillator 29′ to restore it to its desired value. For this purpose, the resistors 57, 57′ are connected through a ripple and anti-hunting filter 58 to the input circuit of a tuning control tube 60. Thus, the filtered, ripple-free, unidirectional control voltage appears across leads 74, 74′. Lead 74′ is connected to the control grid 75 of tuning control tube 60, while lead 74 is connected to cathode 76 of tube 60 through adjustable bias resistor 77. In this way the variable-magnitude, reversible-polarity control voltage is impressed between grid 75 and cathode 76 of tube 60 and controls the internal resistance of this tube 60 in correspondence with the control voltage.

The oscillator 29′ is the same as oscillator 29 except that the plungers 41 and 41′ and their motive means are omitted. Instead, oscillator 29′ may be tuned by variation of the potential of its cathode, since such a potential variation causes an output frequency change for oscillators of this type. For this purpose the cathode 61' of oscillator 29' is connected by a lead 78 to the anode 79 of tube 60. The cathode 76 of tube 60 is connected through resistor 77, lead 74 and lead 73 to the negative terminal of battery 61, whose positive terminal is grounded. The metallic resonators 35 and 35' of oscillator 29' are grounded at 81. Accordingly, the voltage from battery 61 is applied between cathode 61' and resonator 35 of an oscillator 29' in series with the resistance formed by resistor 77 and the anode-cathode path of tube 60.

Battery 61 and resistor 77 are selected or adjusted to produce a potential on cathode 61' producing a desired output frequency from oscillator 29', in the absence of control voltage applied to grid 75. This desired frequency, of course, produces zero control voltage, since the bridge circuit 45 is balanced as discussed above. When the frequency of oscillator 29' varies from this desired value, due to any cause, a control voltage is produced between leads 74 and 74' having a magnitude corresponding to the magnitude of the frequency deviation and a polarity corresponding to the sense of this frequency deviation. This control voltage is applied to the grid of tube 60 and correspondingly varies the internal resistance of tube 60. This variation of resistance varies the voltage between cathode 61' and resonator 35 of oscillator 29' to produce a frequency change in the output of oscillator 29' in a sense tending to restore the output frequency to its desired value. This in turn restores the bridge 45 and resonator 42 toward the balanced condition producing the zero control voltage so that the frequency of oscillator 29' is thereby maintained substantially constant at the desired value.

If desired, a circular cross-section or other resonator oscillating in a single mode may be used in lieu of the dual mode resonator 42. Such a structure is shown in Fig. 10, wherein a circular resonator 62 is used in conjunction with an attenuator 63, which resonator and attenuator are respectively connected to the two "Littlefuses" 44 and 44', as in Fig. 9. In this structure the attenuator 63 is initially adjusted with the oscillator 29' operating at a normal frequency $f_0$ so that the bridge 45 is balanced. However, as soon as the frequency of oscillator 29 shifts, the output of resonator 62 will vary, while the output of attenuator 63 stays relatively constant, resulting in an unbalance of the legs of the bridge so that the output of this bridge will serve to control the frequency of the oscillator 29' in the manner described in connection with Fig. 9.

In Fig. 11 showing the frequency current characteristic of the resonator 62, the operating point of the resonator 62 for normal frequency output of oscillator 29' is the point P so that shifts in frequency above or below this desired frequency result in movement up and down one side of the resonance curve, as is desired.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ultra high frequency discriminator, comprising a hollow resonator having two modes of oscillation of somewhat differing but adjacent resonant frequencies, a source of oscillations, means coupling said source to said resonator to set up both said modes of oscillation therein, and a detector circuit connected to said resonator to be energized by both modes of oscillation.

2. An ultra high frequency discriminator as defined in claim 1, wherein said detector circuit comprises a pair of detectors respectively connected to said resonator to be excited by the respective modes of oscillation, said detectors rectifying in opposite directions.

3. An ultra-high-frequency discriminator comprising a cavity resonator adapted to be excited simultaneously in two different modes of oscillation having adjacent different resonant frequencies, a source of oscillations of substantially single frequency, means coupling said source to said resonator to excite both said modes of oscillation therein at said single frequency, and a detector circuit coupled to said resonator to be energized by both said modes of oscillation.

4. Ultra high frequency apparatus, comprising a hollow resonator adapted to be excited simultaneously in two different modes of oscillation having adjacent different resonant frequencies, means coupled to said resonator for supplying a frequency-modulated carrier wave to said resonator for setting up standing electromagnetic waves therewithin in both said two modes of oscillation, means coupled to said resonator for deriving energy from both of said modes of oscillation, and detector means connected to said coupling means for receiving and demodulating said derived energy.

5. Apparatus of the character described, comprising a source of ultra high frequency oscillation, a cavity resonator adapted to be excited simultaneously in two different modes of oscillation having slightly differing resonant frequencies, means coupling said source to said resonator to excite said two modes of oscillation therein, means for deriving energy of both of said modes of oscillation from said resonator, detector means for receiving and detecting such derived energy, and audio apparatus controlled by a version of the output of said detector means.

6. Apparatus of the character described, comprising an ultra high frequency oscillator, a cavity resonator connected to receive a portion of the output of said oscillator, said cavity resonator being constructed so as to have two modes of oscillation set up therein of slightly differing frequency, means for deriving energy of both of said modes of oscillation from said resonator, detector means for receiving and detecting such derived energy, and means fed with the output of said detector means connected for controlling the frequency of said oscillator.

7. Apparatus of the character described for controlling an ultra high frequency generator as to frequency, comprising a bridge circuit, oscillator means for energizing said bridge circuit, cavity resonator means connected to said high frequency generator and to said bridge circuit for varying the impedance of at least one leg of said bridge circuit, and tuning means for said generator controlled by the output of said bridge circuit for determining the frequency of said generator.

8. Ultra high frequency apparatus, comprising a hollow resonator adapted to be excited simultaneously in two different modes of oscillation having adjacent different resonant frequencies, means for supplying a frequency-modulated carrier wave to said resonator for setting up two standing electromagnetic fields within said resonator of said respective modes, means coupled to said resonator for deriving energy separately from each of said electromagnetic fields, respective detectors connected for receiving said separate energies, and audio apparatus controlled from said detectors.

9. Means for maintaining a generator at substantially fixed frequency output, comprising means for picking off a portion of the energy output of said generator, frequency-responsive means for receiving at least a part of said picked-off energy, and tuning means for said generator responsive to the operation of said frequency-responsive means, said frequency-responsive means comprising a resonator having a pair of modes of oscillation of somewhat differing resonant frequency, and means for deriving a pair of outputs from said resonator, each corresponding to one of said modes of oscillation, the outputs of said resonator being employed differentially for controlling said tuning means.

10. Means for maintaining a generator at fixed frequency, comprising means for picking off a portion of the energy of said generator, a single cavity resonator supplied with said energy and having two modes of oscillation, said two modes of oscillation having resonant frequencies slightly above and below the desired operating frequency of said generator, a push-pull detector circuit supplied with outputs of said resonator corresponding independently to said modes of oscillation, and tuning motive means connected to be driven from said push-pull circuit, said tuning motive means serving to tune said generator.

11. In an apparatus for maintaining an ultra high frequency generator at a desired operating frequency, tuning means for controlling said generator to vary its frequency, cavity resonator means energized from said generator, a bridge circuit connected to be varied by said cavity resonator means, an oscillator for energizing said bridge circuit, and means connected to said bridge circuit and to said oscillator for receiving signal and reference potentials therefrom, said means being connected for controlling said generator tuning means.

12. In apparatus of the character described, a cavity resonator having major and minor axes, means for energizing said resonator to set up two modes of oscillation within said resonator having electric vectors extending substantially parallel to said axes, respectively, energy-removing means coupled to said resonator substantially on the axes thereof, and detector means fed from said energy-removing means.

13. Apparatus for tuning an ultra high frequency oscillator, comprising a single cavity resonator energized from said oscillator and having two modes of oscillation, and control means connected to receive energy from both modes of oscillation for controlling the tuning of said oscillator.

14. High frequency apparatus comprising a cavity resonator having two modes of oscillation of but slightly differing resonant frequencies, means for supplying energy at substantially a single frequency to said resonator for exciting oscillations therein of said frequency and of both of said modes, means for deriving respective output energies of said frequency from said resonator responsive independently to the amplitude of oscillation of each of said modes, and means responsive to said output energies for producing a signal corresponding to deviations of the frequency of said single-frequency supplied energy from a predetermined relationship to said resonant frequencies.

15. High frequency apparatus comprising a cavity resonator having a cross-section of elliptical form, an input coupling for said resonator displaced from the major and minor axes of said cross-section, a source of energy of substantially a single frequency connected to said coupling, respective output couplings for said resonator disposed respectively at the major and minor axes of said cross-section, whereby respective output energies of said frequency are derived, and means coupled to said output couplings and responsive to said respective output energies for producing a signal corresponding to deviations of the frequency of said source from a predetermined relation to those of said resonator.

16. Apparatus for detecting an ultra-high-frequency carrier wave frequency-modulated by a modulation signal, comprising a cavity resonator adapted to be excited simultaneously in two different modes of oscillation having adjacent different resonant frequencies, means coupled to said resonator for supplying thereto said wave to be detected and for exciting therein oscillations of the frequency of said wave and in both said modes of oscillation, and detector means coupled to said resonator for receiving energy of both said modes of oscillation and for producing said modulation signal of said wave.

17. High frequency apparatus comprising a cavity resonator having modes of oscillation of slightly differing resonant frequency, a source of energy of substantially a single frequency in neighborhood of said differing resonant frequencies, coupling means coupled to said source and adapted when energized to excite a plurality of said modes of oscillation within said resonator, each at said single source frequency, a plurality of further coupling means for said resonator each adapted to be excited only by a respective one of said modes of oscillation, and an output circuit coupled to all said further coupling means.

18. Ultra-high-frequency discriminator apparatus comprising a cavity resonator adapted to be excited simultaneously at two separate modes of oscillation having slightly different and adjoining resonant frequencies, and detector means coupled to said resonator and responsive separately to the amplitudes of oscillation of said separate modes, for producing an output signal corresponding to the difference between said amplitudes.

19. Apparatus as in claim 18 wherein said detector means comprises a pair of rectifiers relatively reversely coupled to said resonator to be responsive respectively and independently to said mode amplitudes, a pair of series-connected resistors connected between said rectifiers, and an output circuit connected to the junction of said resistors.

20. Apparatus as in claim 18 wherein said detector means comprises a pair of rectifiers coupled to said resonator to be responsive respectively and independently to said mode amplitudes, a pair of resistors connected in series with said rectifiers, and an output circuit coupled across said resistors.

21. Apparatus as in claim 18, wherein said detector means comprises a pair of resistors variable in resistance with change in ultra-high-frequency excitation thereof, means coupling said resistors respectively to said resonator to be excited respectively and independently in accordance with said mode amplitudes, an output circuit, and means comprising a bridge circuit responsive to relative resistance unbalance of said resistors for coupling said output circuit to said resistors.

WILLIAM W. HANSEN.
VINCENT R. LEARNED.

REFERENCES CITED

The following references are of record in the file of this patent:

UNITED STATES PATENTS

| Number | Name | Date |
|---|---|---|
| 2,247,216 | Braaten | June 24, 1941 |
| 2,250,532 | Hansell | July 29, 1941 |
| 2,294,942 | Varian et al. | Sept. 8, 1942 |
| 2,302,834 | Bliss | Nov. 24, 1942 |
| 2,304,377 | Roberts | Dec. 8, 1942 |
| 2,312,070 | Bliss | Feb. 23, 1943 |
| 2,337,184 | Carter | Dec. 21, 1943 |
| 2,357,313 | Carter | Sept. 5, 1944 |
| 2,357,314 | Carter | Sept. 5, 1944 |
| 2,378,944 | Ohl | June 26, 1945 |
| 2,432,093 | Fox | Dec. 9, 1947 |
| 2,439,388 | Hansen | Apr. 13, 1948 |